United States Patent
Rachid et al.

(10) Patent No.: US 7,199,983 B2
(45) Date of Patent: Apr. 3, 2007

(54) MAGNETORESISTIVE DEVICE UTILIZING A MAGNETORESISTANCE EFFECT FOR READING MAGNETIC INFORMATION

(75) Inventors: Sbiaa Rachid, Tokyo (JP); Haruyuki Morita, Tokyo (JP)

(73) Assignee: TDK Corporation, Tokyo (JP)

( * ) Notice: Subject to any disclaimer, the term of this patent is extended or adjusted under 35 U.S.C. 154(b) by 384 days.

(21) Appl. No.: 10/869,838

(22) Filed: Jun. 18, 2004

(65) Prior Publication Data

US 2005/0018366 A1 Jan. 27, 2005

(30) Foreign Application Priority Data

Jun. 20, 2003 (JP) ............... 2003-176932

(51) Int. Cl.
*G11B 5/127* (2006.01)

(52) U.S. Cl. ................................. 360/324.11

(58) Field of Classification Search ............ 360/324.11
See application file for complete search history.

(56) References Cited

U.S. PATENT DOCUMENTS

| | | | | |
|---|---|---|---|---|
| 5,780,176 A | * | 7/1998 | Iwasaki et al. | .......... 428/811.2 |
| 6,953,601 B2 | * | 10/2005 | Li et al. | ...... 427/131 |
| 2003/0227723 A1 | * | 12/2003 | Li et al. | ........ 360/324.11 |
| 2004/0228045 A1 | * | 11/2004 | Hasegawa et al. | ........ 360/324.1 |
| 2004/0246634 A1 | * | 12/2004 | Yuasa et al. | ........... 360/324.11 |
| 2004/0252417 A1 | * | 12/2004 | Hasegawa et al. | ..... 360/324.11 |
| 2005/0174692 A1 | * | 8/2005 | Miyauchi et al. | ........... 360/135 |
| 2005/0186452 A1 | * | 8/2005 | Zhang et al. | ................ 428/828 |
| 2005/0201022 A1 | * | 9/2005 | Horng et al. | .......... 360/324.11 |

FOREIGN PATENT DOCUMENTS

| | | |
|---|---|---|
| JP | 2002-232035 | 8/2002 |
| JP | 2005347512 A | * 12/2005 |

* cited by examiner

*Primary Examiner*—Brian E. Miller
(74) *Attorney, Agent, or Firm*—Oliff & Berridge, PLC

(57) ABSTRACT

A thin-film magnetic head is provided with an antiferromagnetic layer; a pinned layer comprising a first ferromagnetic layer, in contact with the antiferromagnetic layer, a second ferromagnetic layer having a direction of magnetization opposite from that of the first ferromagnetic layer, and a nonmagnetic spacer layer disposed between the first and second ferromagnetic layers; a free layer; and an intermediate layer disposed between the pinned layer and the free layer. The first ferromagnetic layer of the pinned layer is provided with a first layer comprising a ferromagnetic material, and a second layer, disposed between the first layer and the nonmagnetic spacer layer, comprising a ferromagnetic material. The first layer has a bulk scattering coefficient lower than that of the second layer.

8 Claims, 8 Drawing Sheets

MAGNETORESISTIVE DEVICE UTILIZING A MAGNETORESISTANCE EFFECT FOR READING MAGNETIC INFORMATION

BACKGROUND OF THE INVENTION

1. Field of the Invention

The present invention relates to a magnetoresistive device for reading various kinds of magnetic information by utilizing a magnetoresistance effect, such as a thin-film magnetic head for reading magnetic information of a hard disk or the like in particular, a head gimbal assembly, and a hard disk drive.

2. Related Background Art

Various studies have recently been in progress in order to realize higher sensitivity in magnetoresistive devices. Spin-valve magnetoresistive devices, whose electric resistance varies depending on relative magnetic directions of two ferromagnetic layers consisting of free and pinned layers, constitute a basic configuration of recent magnetoresistive devices, whereas attention has been directed to specular spin valves and the like further improving the same (see Japanese Patent Application Laid-Open No. 2002-232035). The specular type increases further the magnetoresistance ratio by utilizing the specular reflection at the interface between a nano-oxide layer (NOL) and a metal layer.

SUMMARY OF THE INVENTION

Utilizing the above-mentioned specular type can yield a relatively high magnetoresistance ratio. However, the inventor has been under pressure to develop a novel magnetoresistive device which can yield a high magnetoresistance ratio without forming a nano-oxide layer, and a thin-film magnetic head equipped therewith.

Meanwhile, a so-called synthetic structure has recently been employed in order to enhance the magnetization pinning effect of a pinned layer. In the synthetic structure, the pinned layer comprises a first ferromagnetic layer in contact with an antiferromagnetic layer, a second ferromagnetic layer having a direction of magnetization opposite from that of the first ferromagnetic layer, and a nonmagnetic spacer layer disposed between the first and second ferromagnetic layers. In this structure, a change in magnetoresistance is obtained depending on relative directions of magnetization of a free layer and the second ferromagnetic layer of the pinned layer. However, since the first ferromagnetic layer of the pinned layer has a magnetization pinned in the direction opposite from that of the second ferromagnetic layer, there is also an action of hindering magnetoresistance from changing.

Under such circumstances, it is an object of the present invention to provide a magnetoresistive device, a thin-film magnetic head, a head gimbal assembly, and a hard disk drive which yield a high magnetization pinning force in a pinned layer and can realize a high magnetoresistance ratio.

For achieving the above-mentioned object, the present invention provides a magnetoresistive device comprising an antiferromagnetic layer; a pinned layer comprising a first ferromagnetic layer, in contact with the antiferromagnetic layer, having a pinned direction of magnetization by exchange-coupling with the antiferromagnetic layer, a second ferromagnetic layer having a direction of magnetization opposite from that of the first ferromagnetic layer, and a nonmagnetic spacer layer disposed between the first and second ferromagnetic layers; a free layer having a direction of magnetization changeable in response to an external magnetic field; and an intermediate layer disposed between the pinned layer and the free layer; the first ferromagnetic layer in the pinned layer including a first layer comprising a ferromagnetic material; and a second layer, disposed between the first layer and the nonmagnetic spacer layer, comprising a ferromagnetic material; the first layer having a bulk scattering coefficient lower than that of the second layer.

The magnetoresistive device of the present invention employs a so-called synthetic structure, thereby enhancing the magnetization pinning force of the pinned layer. The first layer having the lower bulk scattering coefficient in the first ferromagnetic layer of the pinned layer restrains the magnetoresistance change from decreasing because of the fact that the direction of magnetization of the first ferromagnetic layer is opposite from that of the second ferromagnetic layer, thereby being able to realize a high magnetoresistance ratio. Also, the second layer having the higher bulk scattering coefficient is disposed on the second ferromagnetic layer side, whereby the magnetization pinning force of the pinned layer can attain a high value.

Letting $\rho\downarrow$ be the specific resistance of an upwardly spinning electron having a spin in the same direction as the magnetization direction of a ferromagnetic substance, $\rho\uparrow$ be the specific resistance of a downwardly spinning electron having a spin in the opposite direction, and $\rho$ be the specific resistance of the ferromagnetic substance, the bulk scattering coefficient corresponds to $\beta$ satisfying the following expressions (1) and (2):

$$\rho\uparrow = \rho(1-\beta) \quad (1)$$

$$\rho\downarrow = \rho(1+\beta) \quad (2)$$

Preferably, the first layer in the first ferromagnetic layer is formed by FeCr, FeCoCr, FeTa, FeMn, or FeV. Preferably, the second layer in the first ferromagnetic layer is formed by Co, CoFe, CoFeNi, or NiFe.

Preferably, in the magnetoresistive device of the present invention, the first ferromagnetic layer of the pinned layer further comprises a third layer having a bulk scattering coefficient higher than that of the first layer and comprising a ferromagnetic material. In this case, the third layer can further strengthen the coupling between the first ferromagnetic layer of the pinned layer and the antiferromagnetic layer. Thus, the configuration in which the first layer with a low bulk scattering coefficient is held between two ferromagnetic layers each having a high bulk scattering coefficient can yield a high magnetoresistance ratio.

Preferably, the magnetoresistive device of the present invention further comprises, on the side of the free layer opposite from the antiferromagnetic layer, a set of the intermediate layer, the pinned layer, and the antiferromagnetic layer, whereas each of the first ferromagnetic layers positioned on both sides of the free layer includes the first and second layers.

Thus constructing a so-called dual type spin-valve head while providing each of the first ferromagnetic layers on both sides of the free layer with the first and second layers can yield a further higher magnetoresistance ratio.

The thin-film magnetic head, head gimbal assembly, and hard disk drive of the present invention comprise the above-mentioned magnetoresistive device, thereby being able to realize a high reproduction output in the hard disk drive.

The present invention will be more fully understood from the detailed description given hereinbelow and the accom-

DESCRIPTION OF THE PREFERRED EMBODIMENTS

In the following, preferred embodiments of the present invention will be explained in detail with reference to the accompanying drawings. Constituents identical to each other will be referred to with numerals identical to each other without repeating their overlapping explanations.

[First Embodiment]

Figure 1:
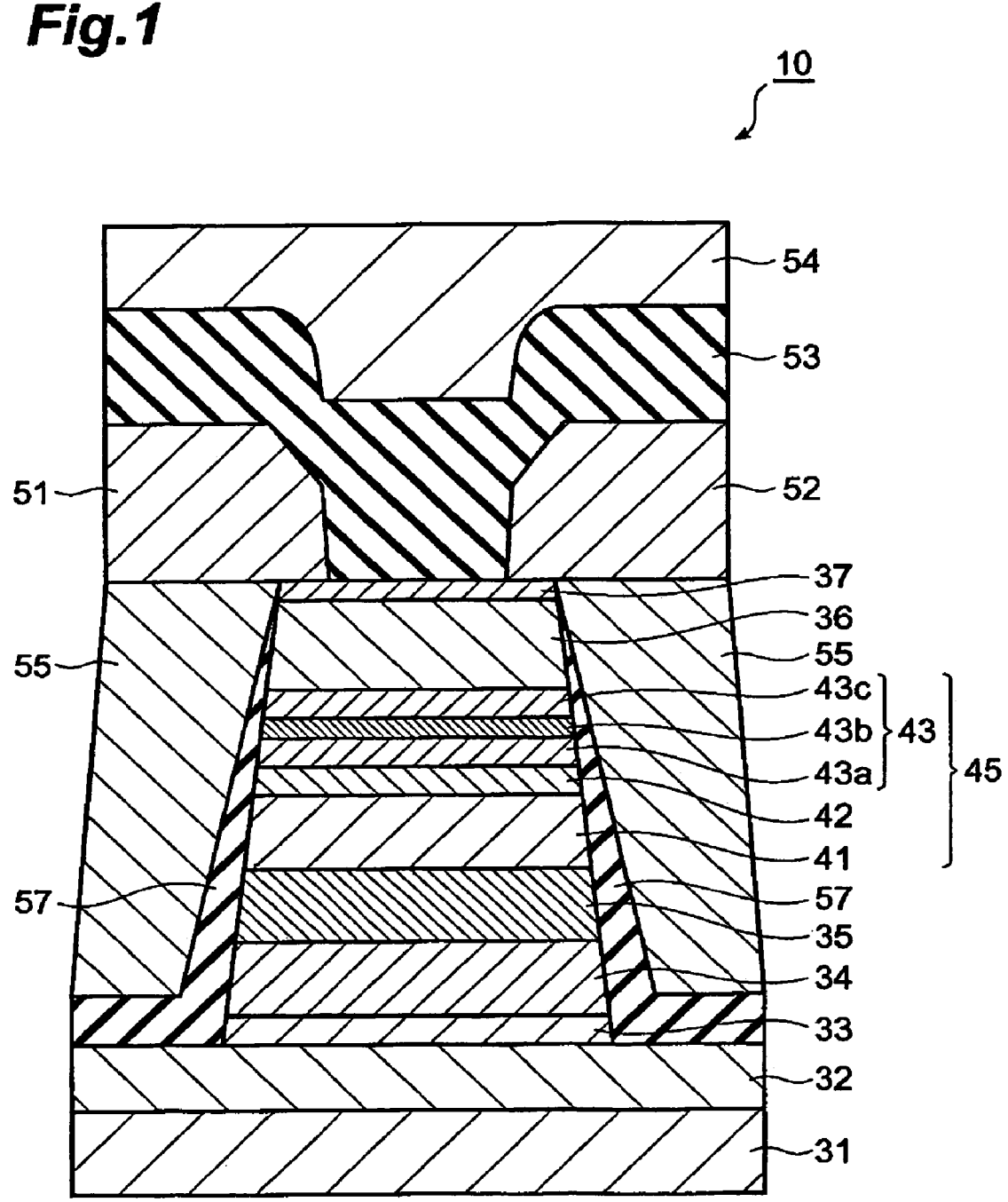
FIG. 1 is a view showing a first embodiment of the thin-film magnetic head in accordance with the present invention.

FIG. 1 is a sectional view showing the thin-film magnetic head in accordance with an embodiment, illustrating a location slightly inside of a surface facing a recording medium (hereinafter referred to as air bearing surface (ABS)) and its vicinity. This thin-film magnetic head 10 is a GMR head utilizing the giant magnetoresistance effect, and comprises a lower shield layer 31, a first gap layer 32, a buffer layer 33, a free layer 34 whose direction of magnetization varies in response to an external magnetic field, a nonmagnetic electrically conductive layer (intermediate layer) 35, a pinned layer 45, an antiferromagnetic layer 36, and a cap layer 37 which are laminated in this order. Here, the free layer 34, electrically conductive layer 35, pinned layer 45, and antiferromagnetic layer 36 constitute the magnetoresistive device of this embodiment.

The thin-film magnetic head 10 employs a so-called CIP (Current In Plane) structure in which a sense current flows in a spreading direction, i.e., surface direction, of the electrically conductive layer 35. By way of a pair of electrode layers 51, 52, the sense current is supplied to an MR film constituted by the free layer 34, electrically conductive layer 35, and the like. In this embodiment, the sense current flows from the electrode layer 51 into the MR film and flows out therefrom by way of the electrode layer 52. Formed on the electrode layers 51, 52 is a second gap layer 53, made of $Al_2O_3$ or the like, electrically insulating them from each other. Laminated on the second gap layer 53 is an upper shield layer 54.

A hard bias layer 55 for turning the free layer 34 into a single domain is formed about the laminate of layers ranging from the buffer layer 33 to the cap layer 37, whereas an undercoat layer 57 for controlling the orientation of the hard bias layer 55 is formed in the region between the laminate and the hard bias layer 55.

The individual layers will now be explained in detail. The first gap layer 32 is formed by $Al_2O_3$, $SiO_2$, or the like, and has a thickness of 5 nm, for example. The buffer layer 33 is formed by Cu, Ta, Cr, Zr, Ti, Ru, or the like, and has a thickness of 5 nm, for example.

The free layer 34 changes its direction of magnetization under the influence of an external magnetic field (e.g., a leakage magnetic field of a hard disk), has a thickness of about 1 nm to about 10 nm, and can be formed by a ferromagnetic material such as Co, CoFe, NiFe, CoNiFe, or CoZrNb, for example. The free layer 34 is turned into a single domain oriented rightward in the drawing, for example, by a magnetic flux from the hard bias layer 55 made of CoTa, CoCrPt, CoPt, or the like.

The electrically conductive layer 35 is disposed between the pinned layer 45 and the free layer 34, and is formed by a nonmagnetic electrically conductive material such as Cu. The electrically conductive layer 35 has a thickness of several nanometers, for example.

The pinned layer 45 has a pinned direction of magnetization by exchange-coupling with the antiferromagnetic layer 36. The pinned layer 45 comprises a first ferromagnetic layer 43 in contact with the antiferromagnetic layer 36, a second ferromagnetic layer 41 having a direction of magnetization opposite from that of the first ferromagnetic layer 43, and a nonmagnetic spacer layer 42 disposed between the first ferromagnetic layer 43 and second ferromagnetic layer 41, thus attaining a so-called synthetic structure. Employing a synthetic structure as such enhances the magnetic direction pinning force in the pinned layer and can reduce the unnecessary leakage magnetic field from the pinned layer 45 to the free layer 34.

The second ferromagnetic layer 41 is formed by Co, CoFe, NiFe, CoFeNi, or the like, and has a thickness on the order of 1.0 to 10 nm, for example.

The nonmagnetic spacer layer 42 is formed by a nonmagnetic material such as Ru, Rh, Re, Cr, or Zr, and has a thickness on the order of about 0.2 nm to about 1.2 nm, for example. The nonmagnetic spacer layer 42 generates an antiferromagnetic exchange coupling between the first ferromagnetic layer 43 and the second ferromagnetic layer 41, thereby causing the layers 43, 41 to have respective directions of magnetization opposite from each other. For example, the first ferromagnetic layer 43 and second ferromagnetic layer 41 have directions of magnetization pinned toward the rear and front sides of the drawing sheet, respectively.

The first ferromagnetic layer 43 has a laminate structure in which a ferromagnetic layer (second layer) 43a and a ferromagnetic layer (third layer) 43c, each having a higher bulk scattering coefficient, hold therebetween a ferromagnetic layer (first layer) 43b having a lower bulk scattering coefficient. The ferromagnetic layers 43a, 43c are formed by a ferromagnetic substance having a bulk scattering coefficient of at least 0.5 but not exceeding 1.0 such as Co (with bulk scattering coefficient β of about 0.5 to 0.6), CoFe (with β of about 0.6 to 0.7), CoFeNi (with β of about 0.5 to 0.6), and NiFe (with β of about 0.5), for example, and may be constituted by either identical or different materials. Among these materials, CoFe or CoFeNi is chosen most preferably. Each of the ferromagnetic layers 43a, 43c has a thickness on the order of 0.1 nm to 2.0 nm, for example. On the other hand, the ferromagnetic layer (first layer) 43b in the first ferromagnetic layer 43 is formed by a ferromagnetic substance having a bulk scattering coefficient lower than that of the ferromagnetic layer 43a, 43c, such as FeCr (with β of about −0.2), FeCoCr (with β of about −0.1), FeTa (with β of about 0 to +0.2), FeMn (with β of about −0.1), and FeV (with β of about −0.2), among which FeCr or FeCoCr is chosen most preferably. The ferromagnetic layer 43b has a thickness on the order of 0.1 nm to 5.0 nm, for example.

As mentioned above, the antiferromagnetic layer 36 is a layer for pinning the magnetization direction of the pinned layer 45. The antiferromagnetic layer 36 has a thickness of about 5 nm to about 20 nm and can be formed by FeMn, IrMn, PtMn, or the like. The material exhibition an antiferromagnetic structure even without heat treatment, thereby inducing an exchange-coupled magnetic field between it and a ferromagnetic material, or a type exhibiting antiferromagnetism upon heat treatment. The cap layer 37 laminated on the antiferromagnetic layer 36 can be formed by Ta, Au, Ru, Pt, or the like, and has a thickness of about 5 nm, for example.

The lower shield layer 31 and upper shield layer 54 are formed by a magnetic material such as NiFe, for example. Each of the shield layers 31, 54 prevents the GMR device from sensing unnecessary magnetic fields.

The foregoing are the configuration of the magnetoresistive device in accordance with this embodiment and that of the thin-film magnetic head equipped therewith. As mentioned above, the thin-film magnetic head 10 employs a so-called synthetic structure, thereby enhancing the magnetization pinning force of the pinned layer 45. Also, the ferromagnetic layer (first layer) 43b having the lower bulk scattering coefficient in the first ferromagnetic layer 43 of the pinned layer 45 restrains the magnetoresistance change from decreasing because of the fact that the direction of magnetization of the first ferromagnetic layer 43 is opposite from that of the second ferromagnetic layer 41, thereby being able to realize a high magnetoresistance ratio. Also, the ferromagnetic layer (second layer) 43b having the higher bulk scattering coefficient is disposed on the second ferromagnetic layer 41 side, whereby the magnetization pinning force of the pinned layer can attain a high value. An experiment conducted by the inventor yielded a high value of magnetoresistance ratio at 15.9% within a range in which the magnetization of the pinned layer 45 was pinned well. Experimental data proving this will be explained in experimental examples which will be set forth later.

Figure 2:
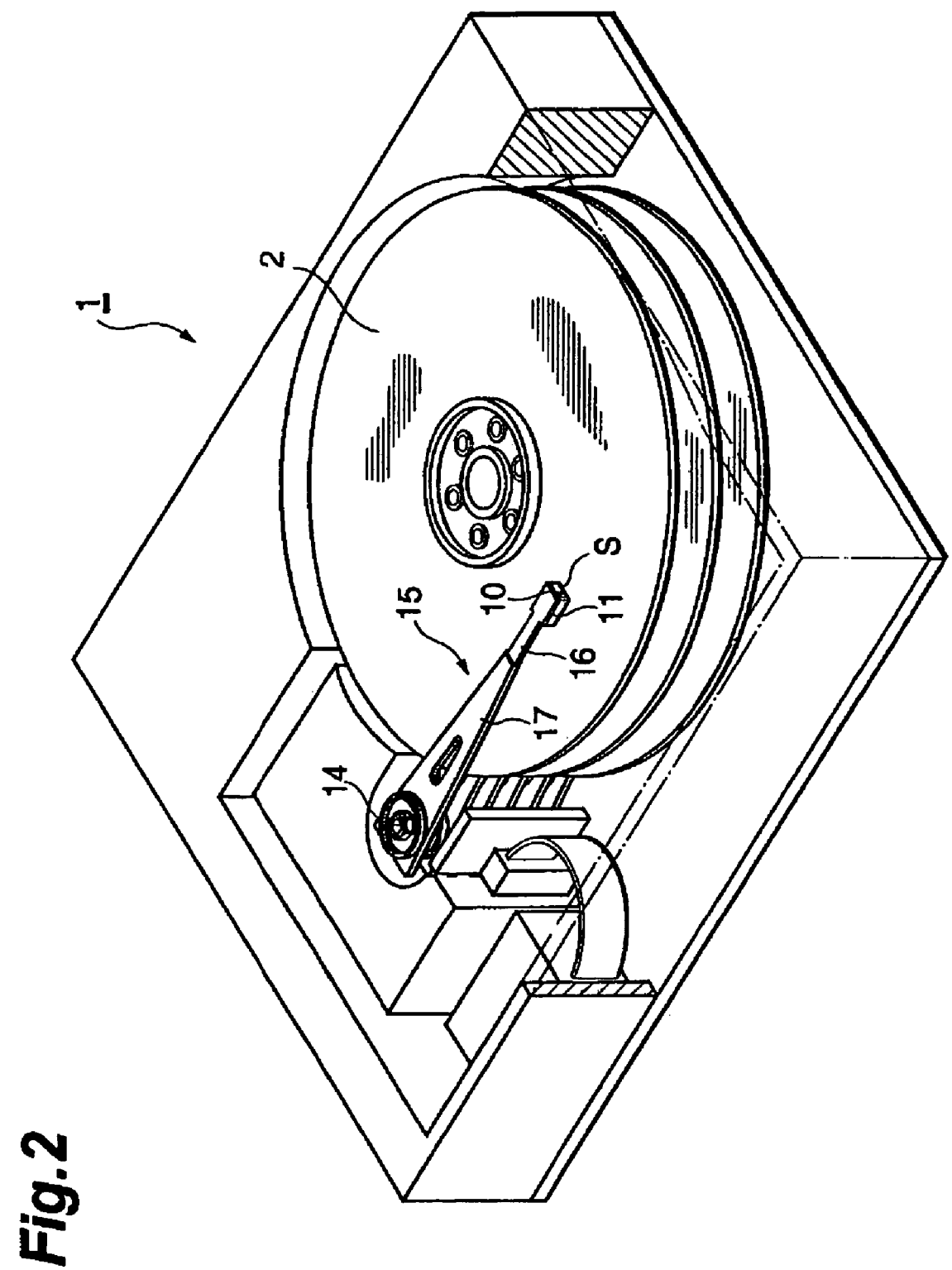
FIG. 2 is a perspective view showing an embodiment of the hard disk drive in accordance with the present invention.

Referring to FIG. 2, a head gimbal assembly and hard disk drive equipped with the above-mentioned thin-film magnetic head 10 will now be explained.

This hard disk drive 1 actuates a head gimbal assembly (HGA) 15, so as to cause the thin-film magnetic head 10 to record and reproduce magnetic information onto and from a recording surface of a hard disk 2 acting as a recording medium rotating at a high speed. The head gimbal assembly 15 comprises a gimbal 16 mounted with a head slider 11 formed with the thin-film magnetic head 10, and a suspension arm 17 connected thereto, while being rotatable about a shaft 14 by a voice coil motor, for example. As the head gimbal assembly 15 is rotated, the head slider moves radially of the hard disk 2, i.e., in a direction traversing track lines.

Such head gimbal assembly 15 and hard disk drive 1 comprise the above-mentioned thin-film magnetic head 10, thereby being able to realize a high magnetoresistance ratio, thus making it possible to attain a high reproduction output in the hard disk drive.

[Second Embodiment]

Figure 3:
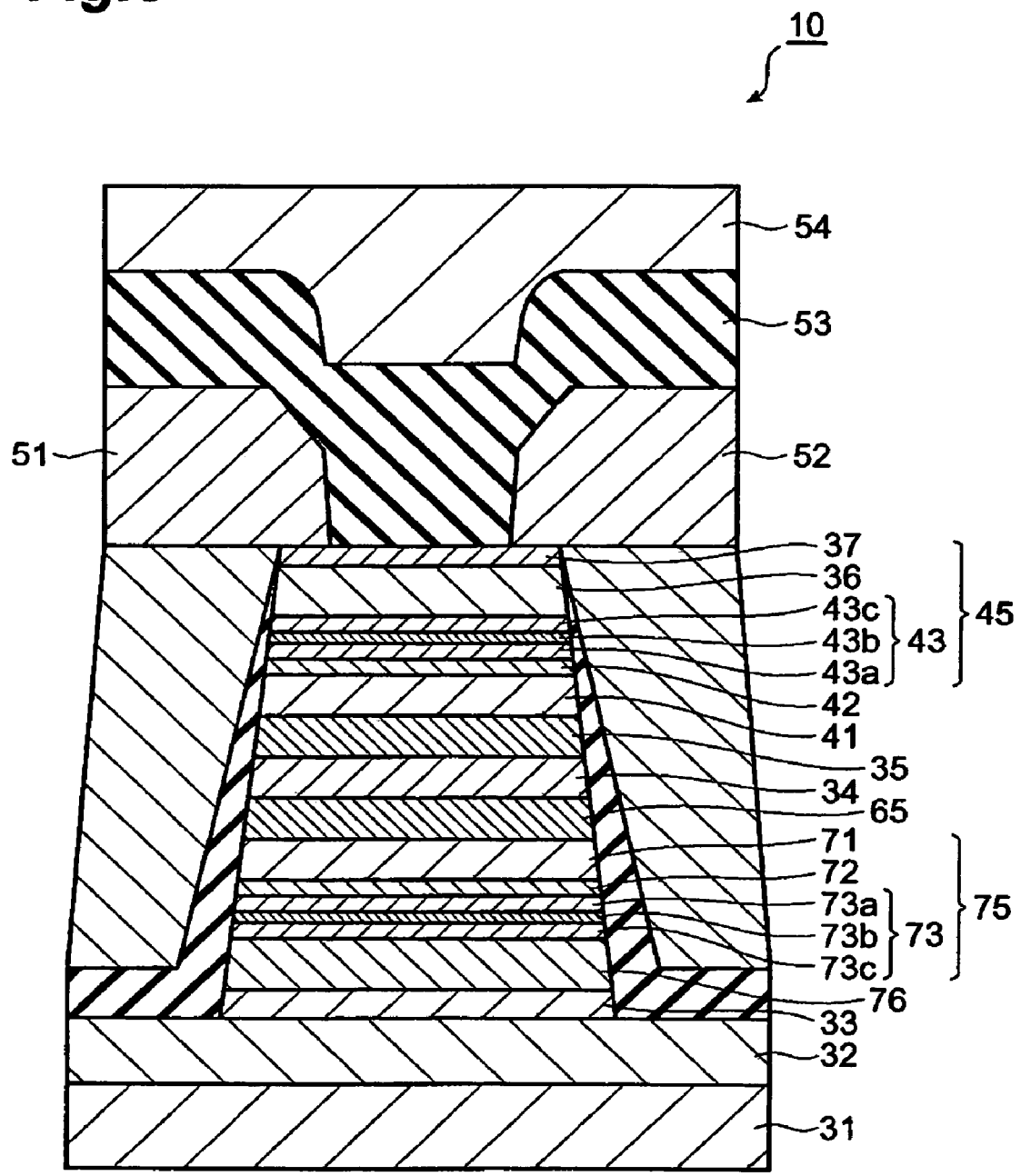
FIG. 3 is a view showing a second embodiment of the thin-film magnetic head in accordance with the present invention.

Referring to FIG. 3, a second embodiment of the magnetoresistive device in accordance with the present invention and the thin-film magnetic head equipped therewith will now be explained. The magnetoresistive device and thin-film magnetic head 10 in accordance with this embodiment are so-called dual type spin-valve heads. Namely, a set of electrically conductive layer, pinned layer, and antiferromagnetic layer is further provided on the side of free layer 34 opposite from the antiferromagnetic layer 36. Specifically, an antiferromagnetic layer 76, a pinned layer 75, and an electrically conductive layer 65 are laminated between the buffer layer 33 and the free layer 34. The configuration of layers ranging from the free layer 34 to the cap layer 37 is the same as that in the first embodiment.

The pinned layer 75 has the same configuration as with the pinned layer 45. Namely, the pinned layer 75 has a synthetic structure comprising a first ferromagnetic layer 73 in contact with the antiferromagnetic layer 76, a second ferromagnetic layer 71 having a direction of magnetization opposite from that of the first ferromagnetic layer 73, and a nonmagnetic spacer layer 72 disposed between the first ferromagnetic layer 73 and the second ferromagnetic layer 71. The first ferromagnetic layer 73 has a laminate structure in which a ferromagnetic layer (second layer) 73a and a ferromagnetic layer (third layer) 73c hold therebetween a lower ferromagnetic layer (first layer) 73b having a bulk scattering coefficient lower than that of the second and third ferromagnetic layers. The ferromagnetic layers 73a, 73b, 73c can be made of the same materials as those of the ferromagnetic layers 43a, 43b, 43c, respectively.

Thus constructing a so-called dual type spin-valve head while providing each of the first ferromagnetic layers 43, 73 on both sides of the free layer 34 with the ferromagnetic layer (first layer) having the lower bulk scattering coefficient can yield a magnetoresistance ratio higher than that in the first embodiment.

[Third Embodiment]

Figure 4:
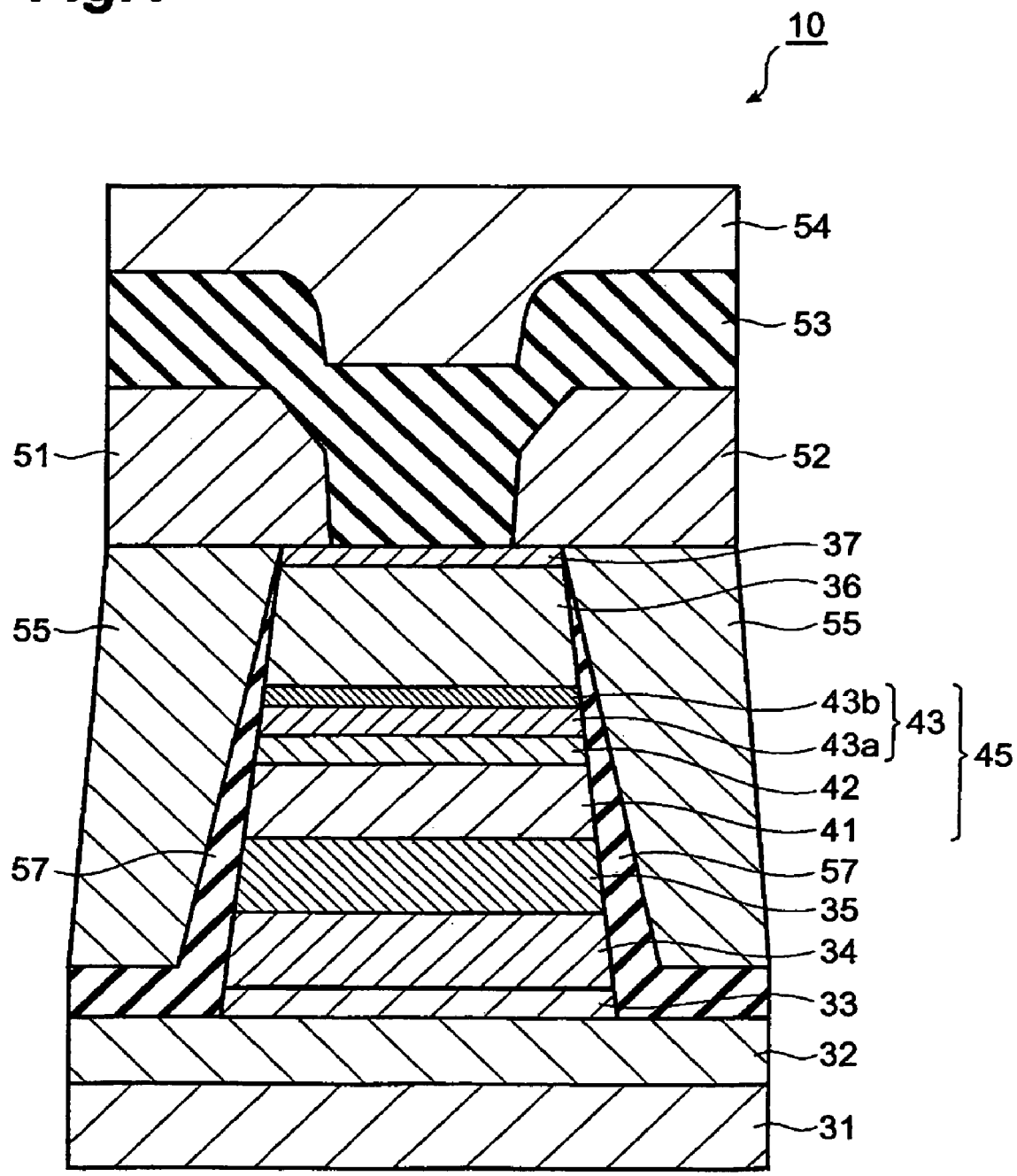
FIG. 4 is a view showing a third embodiment of the thin-film magnetic head in accordance with the present invention.

Referring to FIG. 4, a third embodiment of the thin-film magnetic head in accordance with the present invention will now be explained. In the thin-film magnetic head 10 of this embodiment, the first ferromagnetic layer 43 in the pinned layer 45 has a two-layer structure composed of a ferromagnetic layer (second layer) 43a and a ferromagnetic layer (first layer) 43b having a bulk scattering coefficient lower than that of the second layer. The ferromagnetic layer 43b having the lower bulk scattering coefficient restrains the magnetoresistance change from decreasing because of the fact that the direction of magnetization of the first ferromagnetic layer 43 is opposite from that of the second ferromagnetic layer 41 in such a configuration as well, thereby being able to realize a high magnetoresistance ratio. On the other hand, the ferromagnetic layer 43a having the higher bulk scattering coefficient is disposed on the second ferromagnetic layer 41 side, whereby the magnetization pinning force of the pinned layer can attain a high value. It is also advantageous in that the manufacturing process can be simplified since the number of layers is smaller than that in the first embodiment by 1.

[Fourth Embodiment]

Figure 5:
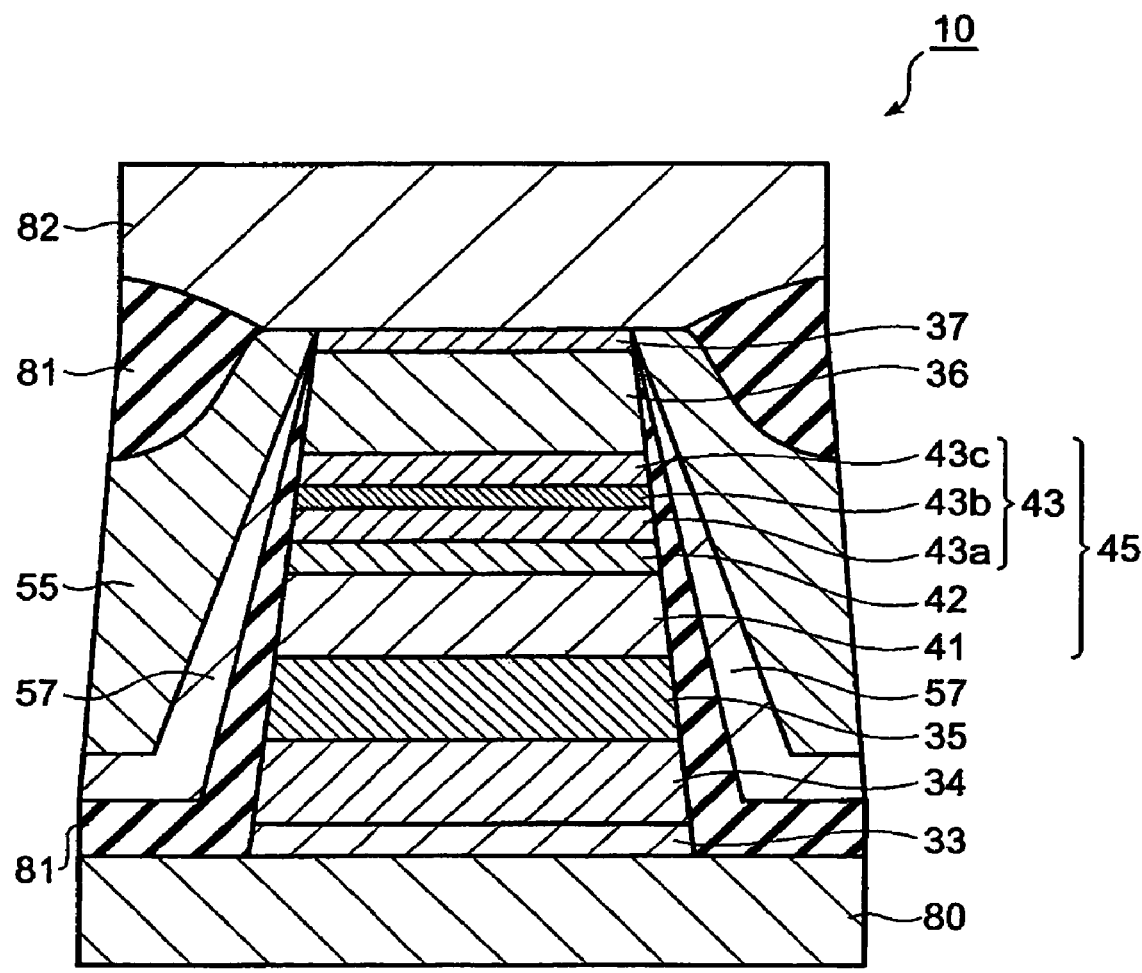
FIG. 5 is a view showing a fourth embodiment of the thin-film magnetic head in accordance with the present invention.

Referring to FIG. 5, a fourth embodiment of the thin-film magnetic head in accordance with the present invention will now be explained. The thin-film magnetic head 10 of this embodiment does not have a CIP structure, but is a GMR head of CPP (Current Perpendicular to Plane) type in which a sense current flows in the layer thickness direction.

The thin-film magnetic head 10 of this embodiment comprises a lower electrode layer 80, made of NiFe, FeAlSi, or the like, also acting as a lower shield layer; and an upper electrode layer 82, made of a material similar thereto, also acting as an upper shield layer. A laminate including a magnetoresistive device is held between the electrode layers 80, 82, whereas the electrodes 80, 82 supply a sense current to the laminate. The laminate has the same configuration as that of the first embodiment, including the buffer layer 33, free layer 34, nonmagnetic electrically conductive layer 35, pinned layer 45, antiferromagnetic layer 36, and cap layer 37.

A hard bias layer 55 is provided beside the magnetoresistive device, whereas an insulating layer 81 made of $Al_2O_3$ or the like for preventing the sense current from leaking, and an undercoat layer 57 for controlling the orientation of the hard bias layer 55 are provided inside the layer 55. An insulating layer 81 is also formed between the upper electrode layer 82 and the hard bias layer 55.

The thin-film magnetic head of CPP structure in accordance with this embodiment comprises a magnetoresistive device having the same configuration as that of the first embodiment, thus yielding a high magnetization pinning force in the pinned layer 45 while being able to realize a high magnetoresistance ratio.

[Examples]

The present invention will now be explained more specifically with reference to Examples.

First, verified in a thin-film magnetic head having a synthetic structure of CIP type was the effectiveness of providing the first ferromagnetic layer in the pinned layer with a first layer comprising a ferromagnetic material and a second layer, disposed between the first layer and the nonmagnetic spacer layer, comprising a ferromagnetic material while making the first layer attain a bulk scattering coefficient lower than that of the second layer. In this experiment, laminates with materials and film thickness values set forth in Table 1 were used. The magnetoresistance ratio was measured not in the state of an actual thin-film magnetic head, but in the state where the layers were laminated on a wafer. More specifically, after the layers of Table 1 were laminated on an Si wafer, they were held in a state where a magnetic field of 1 T was applied thereto for 5 hours in an atmosphere at a temperature of 280° C. Thereafter, utilizing so-called four-point method (providing two electrodes for a current and two electrodes for a voltage, the current flowing in the surface direction of the layers), the magnetoresistance ratio was measured. Thus obtained results are shown in the graph of FIG. 6.

Figure 6:
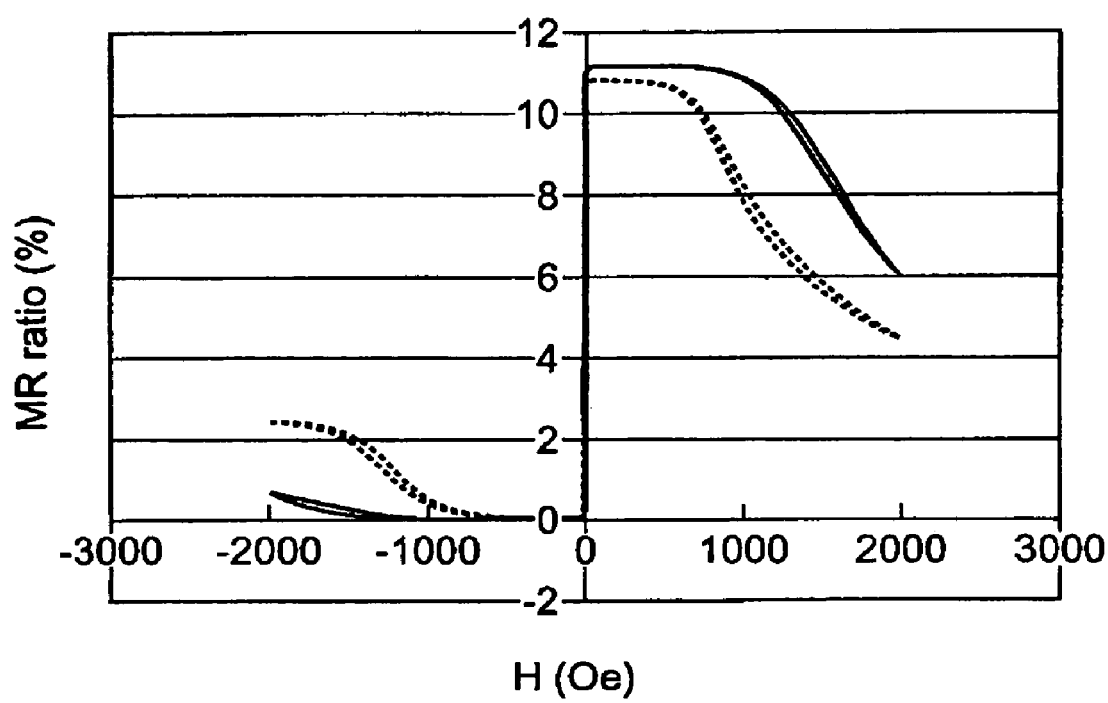
FIG. 6 is a graph showing the respective magnetoresistance ratios in the case (solid lines) provided with an FeCr layer (first layer) and in the case (broken lines) not provided therewith.

In the graph of FIG. 6, the abscissa indicates the applied magnetic field, whereas the ordinate indicates the magnetoresistance ratio. Solid lines show the measured results of Example 1, whereas broken lines show the measured results of Comparative Example 1. The maximum value of magnetoresistance ratio in Comparative Example 1 was 10.83%, whereas that in Example 1 was 11.16%. These results verified that Example 1 in which the pinned layer was provided with an FeCr layer attained a magnetoresistance ratio higher than that in Comparative Example 1 provided with no FeCr layer while no problem occurred in the pinning of magnetization in the pinned layer.

TABLE 1

| KIND OF LAYER | MATERIAL | EX. 1 (nm) | COMP. EX. 1 (nm) |
| --- | --- | --- | --- |
| CAP LAYER | Ta | 5 | 5 |
| ANTIFERROMAGNETIC LAYER | IrMn | 7 | 7 |
| 1ST FERROMAGNETIC LAYER (3RD LAYER) | CoFe | 0.7 | NONE |
| 1ST FERROMAGNETIC LAYER (1ST LAYER) | FeCr | 2.8 | NONE |
| 1ST FERROMAGNETIC LAYER (2ND LAYER) | CoFe | 0.5 | 3 |
| NONMAGNETIC SPACER LAYER | Ru | 0.8 | 0.8 |
| 2ND FERROMAGNETIC LAYER | CoFe | 3 | 3 |
| ELECTRICALLY CONDUCTIVE LAYER | Cu | 3.2 | 3.2 |
| FREE LAYER | CoFe | 3 | 3 |
| BUFFER LAYER | Cu | 1 | 1 |

The fact that the present invention is also effective in the case employing a CPP (Current Perpendicular to Plane) structure in which a thin-film magnetic head causes a sense current to flow in the film thickness direction will now be explained.

First, as shown in Table 2, a laminate having a pinned layer with no FeCr layer was prepared. In this laminate, the pinned layer had a synthetic structure. On the other hand, prepared as Example 2 was a laminate having a structure in which the first ferromagnetic layer of the pinned layer had an FeCr layer (first layer) held by ferromagnetic layers (second and third layers) having a bulk scattering coefficient higher than that of the first layer from both sides thereof. Upon measurement, the magnetoresistive change ratio was 1.45% in Comparative Example 2 and 2.5% in Example 2. This has proved that the present invention is also effective in the case employing the CPP structure.

TABLE 2

| KIND OF LAYER | MATERIAL | EX. 2 (nm) | COMP. EX. 2 (nm) |
| --- | --- | --- | --- |
| CAP LAYER | Ta | 5 | 5 |
| ANTIFERROMAGNETIC LAYER | IrMn | 7 | 7 |
| 1ST FERROMAGNETIC LAYER (3RD LAYER) | CoFe | 0.7 | NONE |
| 1ST FERROMAGNETIC LAYER (1ST LAYER) | FeCr | 2.8 | NONE |
| 1ST FERROMAGNETIC LAYER (2ND LAYER) | CoFe | 0.7 | 3 |
| NONMAGNETIC SPACER LAYER | Ru | 0.8 | 0.8 |
| 2ND FERROMAGNETIC LAYER | CoFe | 3 | 3 |
| ELECTRICALLY CONDUCTIVE LAYER | Cu | 3.2 | 3.2 |
| FREE LAYER | CoFe | 3 | 3 |
| BUFFER LAYER | Ru | 0.8 | 0.8 |

Figure 7:
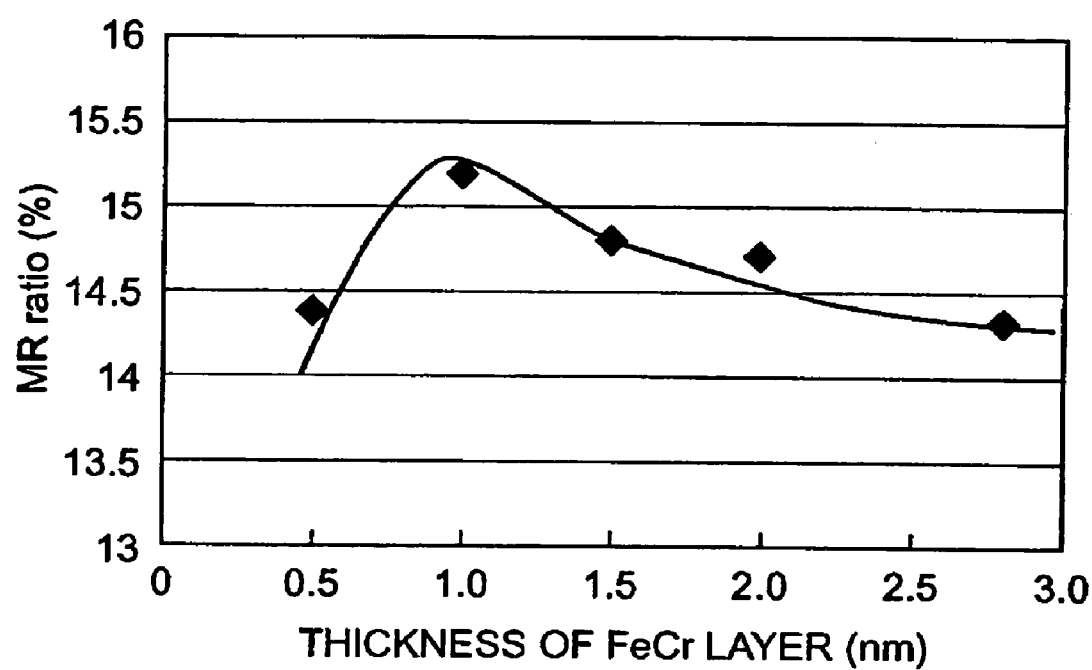
FIG. 7 is a graph showing the relationship between the thickness of FeCr layer (first layer) and the magnetoresistance ratio.

An experiment determining the maximum magnetoresistance ratio will now be explained. First, the magnetoresistance ratio was measured in each of 5 cases where the thickness of the FeCr layer (first layer) of the first ferromagnetic layer in the pinned layer was 0.5 nm, 1.0 nm, 1.5 nm, 2.0 nm, and 2.8 nm, respectively, and the optimal thickness of the FeCr layer was determined. Table 3 shows the material and film thickness of each layer in these cases. The graph of FIG. 7 shows the relationship between film thickness and magnetoresistance ratio of thus measured FeCr layers. As can be seen from this graph, it has been verified that the maximum magnetoresistance ratio is exhibited when the FeCr layer has a thickness of 1.0 nm.

TABLE 3

| KIND OF LAYER | MATERIAL | THICKNESS (nm) |
|---|---|---|
| CAP LAYER | Ta | 3 |
| ANTIFERROMAGNETIC LAYER | IrMn | 7 |
| $1^{ST}$ FERROMAGNETIC LAYER ($3^{RD}$ LAYER) | CoFe | 0.7 |
| $1^{ST}$ FERROMAGNETIC LAYER ($1^{ST}$ LAYER) | FeCr | 0.5, 1.0, 1.5, 2.0, 2.8 (5 CASES) |
| $1^{ST}$ FERROMAGNETIC LAYER ($2^{ND}$ LAYER) | CoFe | 0.7 |
| NONMAGNETIC SPACER LAYER | Ru | 0.8 |
| $2^{ND}$ FERROMAGNETIC LAYER | CoFe | 3 |
| ELECTRICALLY CONDUCTIVE LAYER | Cu | 1.8 |
| FREE LAYER | CoFe | 3 |
| BUFFER LAYER | Ru | 0.8 |

Figure 8:
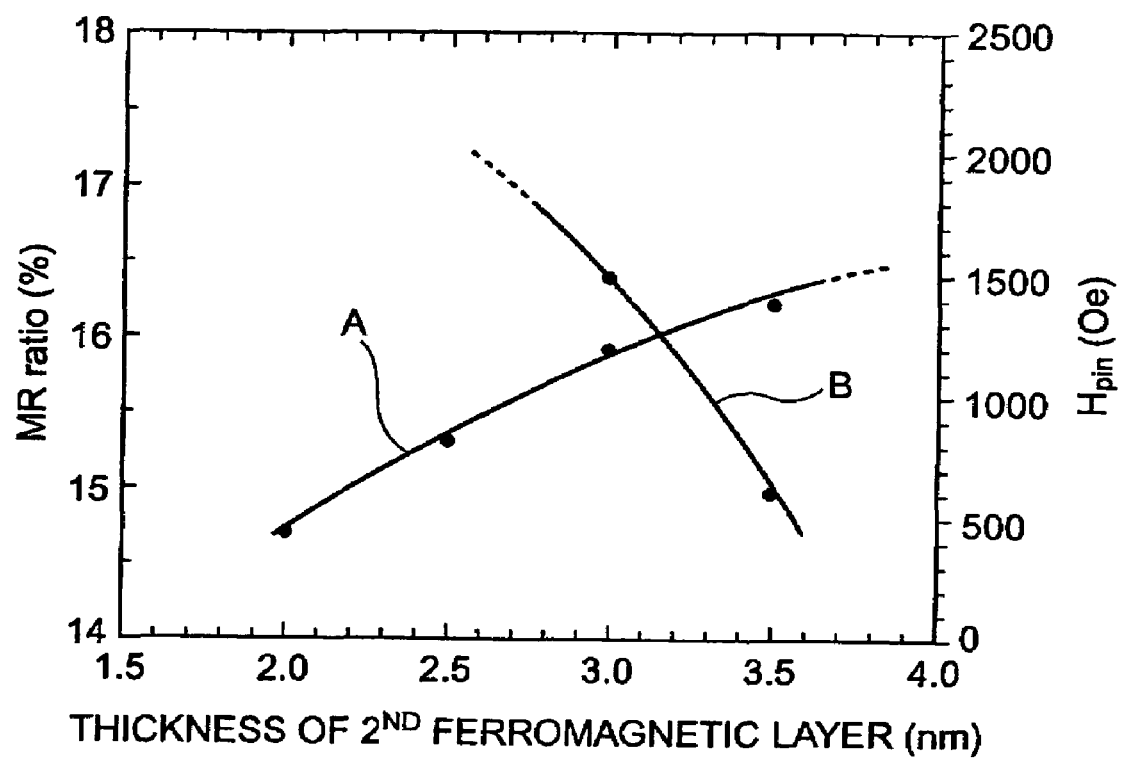
FIG. 8 is a graph showing the relationship between the thickness of the second ferromagnetic layer and the magnetoresistance ratio and $H_{pin}$.

Next, while changing the film thickness of the second ferromagnetic layer, the maximum value of magnetoresistance ratio was determined with the thickness of the FeCr layer being fixed at 1.0 nm. Here, since the pinned layer must not generate pin inversions in order for the thin-film magnetic head to function effectively, the maximum magnetoresistance ratio was determined within a range in which the magnetization of the pinned layer could fully be pinned. Table 4 shows the material and film thickness of each layer in this case. Table 5 and FIG. 8 show the magnetoresistance ratio (%) and $H_{pin}$ (Oe) measured in each of 4 cases where the film thickness of the second ferromagnetic layer was 2.0 nm, 2.5 nm, 3.0 nm, and 3.5 nm, respectively. In FIG. 8, the curve indicated by letter A shows the magnetoresistance ratio (%), whereas the curve indicated by letter B shows $H_{pin}$ (Oe). $H_{pin}$ (Oe) refers to the magnetic field at a limit where the pinned layer generates a pin inversion. In this experiment, only the case where the magnetization direction was rotated by 180° (i.e., completely reversed) was not taken as a pin inversion, whereas the case where the magnetization pinned to one direction was rotated by an angle greater than 90° so as to tilt to the opposite side was considered to generate a pin inversion.

TABLE 4

| KIND OF LAYER | MATERIAL | THICKNESS (nm) |
|---|---|---|
| CAP LAYER | Ta | 5 |
| ANTIFERROMAGNETIC LAYER | IrMn | 7 |
| $1^{ST}$ FERROMAGNETIC LAYER ($3^{RD}$ LAYER) | CoFe | 0.7 |

TABLE 4-continued

| KIND OF LAYER | MATERIAL | THICKNESS (nm) |
|---|---|---|
| $1^{ST}$ FERROMAGNETIC LAYER ($1^{ST}$ LAYER) | FeCr | 1.0 |
| $1^{ST}$ FERROMAGNETIC LAYER ($2^{ND}$ LAYER) | CoFe | 0.7 |
| NONMAGNETIC SPACER LAYER | Ru | 0.8 |
| $2^{ND}$ FERROMAGNETIC LAYER | CoFe | 2.0, 2.5, 3.0, 3.5 (4 CASES) |
| ELECTRICALLY CONDUCTIVE LAYER | Cu | 1.8 |
| FREE LAYER | CoFe | 3 |
| BUFFER LAYER | Ru | 0.8 |

TABLE 5

| SAMPLE NO. | THICKNESS OF $2^{ND}$ FERROMAGNETIC LAYER (nm) | MAGNETORESISTANCE RATIO (%) | $H_{pin}$ (Oe) |
|---|---|---|---|
| 1 | 2.0 | 14.7 | 2000 or more |
| 2 | 2.5 | 15.3 | 2000 or more |
| 3 | 3.0 | 15.9 | 1485 |
| 4 | 3.5 | 16.2 | 600 |

In general, as the second ferromagnetic layer becomes thicker, the magnetoresistance ratio increases, but the magnetization pinning force of the pinned layer decreases. In this example, however, the first ferromagnetic layer has a laminate structure in which two ferromagnetic layers having a higher bulk scattering coefficient hold therebetween a ferromagnetic layer having a lower bulk scattering coefficient, so that the ferromagnetic layer having the higher bulk scattering coefficient on the nonmagnetic spacer side and the second ferromagnetic layer couple with each other firmly, thereby preventing the magnetization pinning force from deteriorating upon increasing the thickness of the second ferromagnetic layer.

As shown in Table 5 and FIG. 8, the magnetoresistance ratio increases as the second ferromagnetic layer becomes thicker. In Table 5, the maximum value of magnetoresistance ratio is attained by sample No. 4 (whose second ferromagnetic layer has a thickness of 3.5 nm). However, $H_{pin}$ in this sample is only about 600 (Oe), so that the pinned layer easily generates a pin inversion, which makes it difficult for the sample to be used as a thin-film magnetic head in practice. In view of this point, 15.9% yielded by sample No. 3 (whose second ferromagnetic layer has a thickness of 3.0 nm) in which $H_{pin}$ is at a value (1485 (Oe)) tolerable for practical use becomes an effective value of magnetoresistance ratio. Namely, without a nano-oxide layer (NOL), the present invention can realize a very high magnetoresistance ratio of about 16% and can enhance the magnetization pinning force of the pinned layer.

Though the invention achieved by the inventor is explained specifically with reference to embodiments in the foregoing, the present invention is not restricted to the above-mentioned embodiments. For example, the magnetoresistive device of the present invention is applicable not only to the thin-film magnetic head, but also to magnetic memories, various kinds of magnetic sensors such as mobile sensors, and the like.

As explained in the foregoing, the magnetoresistive device in accordance with the present invention yields a high magnetization pinning force in the pinned layer and can realize a high magnetoresistance ratio. Also, the thin-film magnetic head, head gimbal assembly, and hard disk drive of the present invention comprise such an magnetoresistive device, thereby being able to realize a high reproduction output in the hard disk drive.

The basic Japanese Application No. 20.03-176932 filed on Jun. 20, 2003 is hereby incorporated by reference.

What is claimed is:

1. A magnetoresistive device comprising:
    an antiferromagnetic layer;
    a pinned layer comprising a first ferromagnetic layer, in contact with said antiferromagnetic layer, having a pinned direction of magnetization by exchange-coupling with said antiferromagnetic layer, a second ferromagnetic layer having a direction of magnetization opposite from that of said first ferromagnetic layer, and a nonmagnetic spacer layer disposed between said first and second ferromagnetic layers;
    a free layer having a direction of magnetization changeable in response to an external magnetic field; and
    an intermediate layer disposed between said pinned layer and said free layer;
    said first ferromagnetic layer in said pinned layer including:
    a first layer comprising a ferromagnetic material; and
    a second layer, disposed between said first layer and said nonmagnetic spacer layer, comprising a ferromagnetic material;
    said first layer having a bulk scattering coefficient lower than that of said second layer.

2. A magnetoresistive device according to claim 1, wherein said first layer in said first ferromagnetic layer is formed by one of FeCr, FeCoCr, FeTa, FeMn, and FeV.

3. A magnetoresistive device according to claim 1, wherein said second layer in said first ferromagnetic layer is formed by one of Co, CoFe, CoFeNi, and NiFe.

4. A magnetoresistive device according to claim 1, wherein said first ferromagnetic layer of said pinned layer further comprises a third layer, disposed on the side of said first layer opposite from said second layer, having a bulk scattering coefficient higher than that of said first layer and comprising a ferromagnetic material.

5. A magnetoresistive device according to claim 1, further comprising, on the side of said free layer opposite from said antiferromagnetic layer, a set of said intermediate layer, said pinned layer, and said antiferromagnetic layer;
    wherein each of said first ferromagnetic layers positioned on both sides of said free layer includes said first and second layers.

6. A thin-film magnetic head comprising:
    an antiferromagnetic layer;
    a pinned layer comprising a first ferromagnetic layer, in contact with said antiferromagnetic layer, having a pinned direction of magnetization by exchange-coupling with said antiferromagnetic layer, a second ferromagnetic layer having a direction of magnetization opposite from that of said first ferromagnetic layer, and a nonmagnetic spacer layer disposed between said first and second ferromagnetic layers;
    a free layer having a direction of magnetization changeable in response to an external magnetic field; and
    an intermediate layer disposed between said pinned layer and said free layer;
    said first ferromagnetic layer in said pinned layer including:
    a first layer comprising a ferromagnetic material; and
    a second layer, disposed between said first layer and said nonmagnetic spacer layer, comprising a ferromagnetic material;
    said first layer having a bulk scattering coefficient lower than that of said second layer.

7. A head gimbal assembly having a thin-film magnetic head mounted to a gimbal, said thin-film magnetic head comprising:
    an antiferromagnetic layer;
    a pinned layer comprising a first ferromagnetic layer, in contact with said antiferromagnetic layer, having a pinned direction of magnetization by exchange-coupling with said antiferromagnetic layer, a second ferromagnetic layer having a direction of magnetization opposite from that of said first ferromagnetic layer, and a nonmagnetic spacer layer disposed between said first and second ferromagnetic layers;
    a free layer having a direction of magnetization changeable in response to an external magnetic field; and
    an intermediate layer disposed between said pinned layer and said free layer;
    said first ferromagnetic layer in said pinned layer including:
    a first layer comprising a ferromagnetic material; and
    a second layer, disposed between said first layer and said nonmagnetic spacer layer, comprising a ferromagnetic material;
    said first layer having a bulk scattering coefficient lower than that of said second layer.

8. A hard disk drive comprising a hard disk writable with magnetic information, and a thin-film magnetic head for reading said magnetic information;
    said thin-film magnetic head comprising:
    an antiferromagnetic layer;
    a pinned layer comprising a first ferromagnetic layer, in contact with said antiferromagnetic layer, having a pinned direction of magnetization by exchange-coupling with said antiferromagnetic layer, a second ferromagnetic layer having a direction of magnetization opposite from that of said first ferromagnetic layer, and a nonmagnetic spacer layer disposed between said first and second ferromagnetic layers;
    a free layer having a direction of magnetization changeable in response to an external magnetic field; and
    an intermediate layer disposed between said pinned layer and said free layer;
    said first ferromagnetic layer in said pinned layer including:
    a first layer comprising a ferromagnetic material; and
    a second layer, disposed between said first layer and said nonmagnetic spacer layer, comprising a ferromagnetic material;
    said first layer having a bulk scattering coefficient lower than that of said second layer.

* * * * *